(12) United States Patent
Sporer et al.

(10) Patent No.: US 7,311,268 B2
(45) Date of Patent: Dec. 25, 2007

(54) NOZZLE BODY FOR A CLEANING SYSTEM ON A MOTOR VEHICLE

(75) Inventors: Jürgen Sporer, Schönwald (DE); Peter Zielke, Adorf/V (DE)

(73) Assignee: Rehau AG & Co., Rehau (DE)

( * ) Notice: Subject to any disclaimer, the term of this patent is extended or adjusted under 35 U.S.C. 154(b) by 188 days.

(21) Appl. No.: 10/848,141

(22) Filed: May 19, 2004

(65) Prior Publication Data

US 2004/0256491 A1 Dec. 23, 2004

(30) Foreign Application Priority Data

May 21, 2003 (DE) ............................ 103 23 454

(51) Int. Cl.
B05B 7/16 (2006.01)
(52) U.S. Cl. ............... 239/128; 239/284.1; 239/284.2; 239/569; 239/130; 239/133
(58) Field of Classification Search .......... 239/284.1, 239/284.2, 128, 130, 133, 569; 123/549
See application file for complete search history.

(56) References Cited

U.S. PATENT DOCUMENTS

| | | | | | |
|---|---|---|---|---|---|
| 3,898,422 | A | * | 8/1975 | Fuller et al. ............... | 219/201 |
| 4,177,375 | A | * | 12/1979 | Meixner ..................... | 219/441 |
| 4,212,425 | A | * | 7/1980 | Schlick ....................... | 239/133 |
| 4,357,590 | A | * | 11/1982 | Belhomme .................. | 338/23 |
| 4,367,718 | A | * | 1/1983 | Heine .......................... | 123/557 |
| 4,377,148 | A | * | 3/1983 | Ishida ......................... | 123/549 |
| 4,424,787 | A | * | 1/1984 | Fitz ............................. | 123/549 |
| 4,508,957 | A | * | 4/1985 | Rocchitelli .................. | 392/479 |
| RE32,396 | E | * | 4/1987 | Fitz ............................. | 123/549 |
| 4,899,032 | A | * | 2/1990 | Schwarzl et al. ........... | 219/540 |
| 5,097,563 | A | * | 3/1992 | Cowan ........................ | 15/313 |
| 5,354,965 | A | * | 10/1994 | Lee .............................. | 219/202 |
| 5,957,385 | A | * | 9/1999 | Suhring et al. ........... | 239/284.1 |
| 5,979,796 | A | * | 11/1999 | Ponziani et al. ......... | 239/284.1 |
| 6,062,206 | A | * | 5/2000 | Nelson et al. ............. | 123/573 |
| 6,155,299 | A | | 12/2000 | Martin | |
| 6,220,524 | B1 | | 4/2001 | Tores et al. | |
| 6,285,005 | B1 | * | 9/2001 | Aakalu et al. ............. | 219/208 |
| 6,393,652 | B1 | * | 5/2002 | Vogt .......................... | 15/250.04 |
| 6,501,907 | B1 | * | 12/2002 | Rehs .......................... | 392/473 |
| 6,789,530 | B2 | * | 9/2004 | Navalon Carretero et al. .......................... | 123/556 |

FOREIGN PATENT DOCUMENTS

DE 30 39 663 A1 5/1982

(Continued)

*Primary Examiner*—Kevin Shaver
*Assistant Examiner*—Trevor McGraw
(74) *Attorney, Agent, or Firm*—Venable LLP; Robert Kinberg; Ryan M. Flandro

(57) ABSTRACT

A nozzle body for a cleaning system on a motor vehicle includes at least one feed line element adapted for connection to a cleaning liquid supply container. At least one nozzle element is connected to the feed line element by a channel section in the basic body. A heating device to heat the connecting channel section is arranged adjacent to the nozzle element, such that the nozzle element is located in a heating zone that is primarily heated by the heating device.

12 Claims, 3 Drawing Sheets

FOREIGN PATENT DOCUMENTS

| | | |
|---|---|---|
| DE | 31 24 112 A1 | 12/1982 |
| DE | 84 31 147.9 U1 | 1/1985 |
| DE | 84 31 147 U1 | 1/1985 |
| DE | 34 33 091 A1 | 3/1986 |
| DE | 41 00 884 A1 | 7/1991 |
| DE | 195 23 068 A1 | 8/1996 |
| DE | 198 33 142 A1 | 2/2000 |
| DE | 199 06 197 A1 | 8/2000 |
| DE | 100 31 445 A1 | 1/2002 |
| DE | 100 53 684 A1 | 5/2002 |
| EP | 0 123 103 A3 | 10/1984 |
| EP | 0 174 521 A1 | 3/1986 |
| EP | 0 353 643 A3 | 2/1990 |
| EP | 0 724 992 A1 | 8/1996 |
| EP | 1 101 534 B1 | 5/2001 |
| EP | 1 184 240 A2 | 3/2002 |
| GB | 2 250 218 A | 6/1992 |
| WO | WO-2004/035359 A1 | 4/2004 |

\* cited by examiner

NOZZLE BODY FOR A CLEANING SYSTEM ON A MOTOR VEHICLE

CROSS-REFERENCE TO RELATED APPLICATION

This application claims the priority of German Patent Application No. 103 23 454.3, filed on May 21, 2003, the subject matter of which is incorporated herein by reference.

The invention relates to a nozzle body for a cleaning system on a motor vehicle including at least one feed line element adapted for connection to a cleaning liquid supply container, a basic body having a channel section, at least one nozzle element connected to the feed line element by the connecting channel section in the basic body, and a heating device to heat the connecting channel section. The invention further relates to a nozzle body for a cleaning system on a motor vehicle, including at least one feed line element adapted to be connected to a supply container for cleaning liquid, a basic body having a connecting channel section, and at least one nozzle element connected to the feed line element by the connecting channel section in the basic body.

Nozzle bodies of the first mentioned type are known from European Patent Application EP 1 101 534 B1. Nozzle bodies of the second mentioned type are known from German patent document DE 195 03 068 A1.

In most application cases, the heating device of the nozzle body according to EP 1 101 534 B1 prevents a failure of the nozzle body caused by icing up of the connecting line section. However, a failure of the nozzle body cannot be ruled out completely, particularly at very low outside temperatures. Cleaning systems equipped with the known nozzle bodies must be operated for some time before they meet their cleaning function, in particular following a longer service life.

SUMMARY OF THE INVENTION

Thus, it is an object of the present invention to modify a nozzle body of the type first mentioned above to improve the handling of a cleaning system provided with a nozzle body of this type. In particular, it is an object to prevent a failure of the nozzle body even during extremely low temperatures.

This object is achieved according to the invention by the provision of a nozzle body for a cleaning system on a motor vehicle, comprising: at least one feed line element adapted for connection to a cleaning liquid supply container; a basic body having a connecting channel section; at least one nozzle element connected to the feed line element by the connecting channel section in the basic body; and a heating device to heat the connecting channel section and arranged adjacent to the nozzle element, such that the nozzle element is located in a heating zone that is primarily heated by the heating device.

For this invention, it was discovered that icing up of the at least one nozzle element can lead to failure of the known nozzle body at very low outside temperatures. The heating device arranged in accordance with the invention ensures that in particular the at least one nozzle element is heated efficiently, wherein the nozzle element is located in a heating zone primarily heated by the heating device. This position requirement is met if the nozzle element is installed directly adjacent to the heating device or if the nozzle element is no longer heated via several intermediate layers. A thorough analysis of the thermal behavior of the nozzle body as disclosed in EP 1 101 534 B1 led to the discovery that the nozzle body is located too far from the heating zone between the terminal contact elements for the resistance heating device in use and that additionally the nozzle element is heated from the heating zone via several intermediate layers, namely an end section of a heating insert that is not located in the heating zone, as well as a portion of the basic body. The arrangement according to present invention avoids such a remote installation of the nozzle element, which additionally results in an indirect heating. The nozzle element according to the invention can therefore be heated up quickly and efficiently by the heating device. A failure of the nozzle body is securely avoided, even with extremely low outside temperatures.

In one exemplary embodiment of the invention the heating device comprises an electrical resistance heater. According to another exemplary embodiment the basic body is made of conductive plastic for integrating the heating device into the nozzle body.

According to another exemplary embodiment, the basic body and the nozzle element are made from electrically conductive material, and the nozzle element has a lower electrical resistance than the material of the basic body. With such a construction, a higher heating current flows in the nozzle elements, thus resulting in a higher heating output. The primarily heated zone is thus displaced in the direction of the nozzle elements.

In a further exemplary embodiment, the heating device comprises ring-shaped, aligned electrical terminal contact elements with parallel ring planes, between which the heating zone is located. This permits a specific adaptation of the shape of the heating zone to the requirements of the nozzle body. In the process, the heating current in particular can flow into the basic body segment that surrounds the connecting channel section and can heat up this section.

A positive-temperature coefficient (PTC) element represents an alternative embodiment of a heating device. A thermo-conducting cast resin is particularly efficient for thermally and mechanically connecting the PTC element to the basic body.

According to another exemplary embodiment of the invention there is provided a nozzle body for a cleaning system on a motor vehicle, comprising: at least one feed line element adapted to be connected to a supply container for cleaning liquid; a basic body having a connecting channel section; at least one nozzle element connected to the feed line element by the connecting channel section in the basic body; and a reflux valve in the connecting channel section of the basic body which prevents a return flow of cleaning liquid from the nozzle element to the supply container.

The reflux valve according to the invention prevents a return flow of cleaning liquid from the nozzle body to the supply container. Thus, a cleaning liquid column is always present between the supply container and the nozzle container, even after a long service life. Operating the cleaning system therefore leads to an immediate release of cleaning liquid from the nozzle element and to a fast cleaning by the cleaning system.

In one exemplary embodiment, the reflux valve has a valve body that is elastically deformable by a pressure of the cleaning liquid. This construction requires little production expenditure. In particular, no mechanical control of the valve body is required.

In another exemplary embodiment, the valve body may be implemented as an elastic valve disk. A reduction in the wall thickness of the valve disk toward an outer disk edge increases the elasticity of the valve disk in this region and thus also the response sensitivity of the reflux valve.

In an alternative embodiment, the valve body may comprise an elastic or flexible tube section.

Other types of reflux valves that may be used are known from diverse technical areas. These include, for example, arrangements having a ball for the valve body, if necessary also pre-stressed with a spring, as well as the standard reflux valves used for bicycles.

The use of a stop element leads to a defined movement of the valve body between a closed position and an open position.

In a further exemplary embodiment, the reflux valve seals a through opening between the connecting channel section and the outside of the basic body. Such a through opening is necessary for producing the nozzle body and the sealing of this through opening simplifies the production and/or the design of the nozzle body.

According to another exemplary embodiment, the nozzle element comprises a spray ball held inside a complementary receptacle of the basic body. In this way, the spraying direction for the spray ball can be freely adjusted. The nozzle element may be held in the receptacle in a manner to be replaceable to permit a simple replacement of the ball, which may become necessary, for example, if the spray ball becomes clogged due to calcification.

According to another modified embodiment, a return-flow line element is adapted to be connected to the supply container for the cleaning liquid, and the connecting channel section includes a bypass element between the feed line element and the return-flow element. In this way, the return-flow line element can be used to bridge the nozzle element in the nozzle body, so that the cleaning liquid can be supplied quickly to the nozzle body without the connecting channel cross section in the nozzle body being limited by the narrow line in the nozzle element.

According to yet another modification, the bypass element comprises a tap line section which penetrates the basic body from the outside through a wall and penetrates the connecting channel section between the feed line element and the return-flow element, forming an intersection, wherein the tap line section is closed off by a closing element at the location where the tap line section penetrates the wall of the basic body.

BRIEF DESCRIPTION OF THE DRAWINGS

Exemplary embodiments of the invention are explained in further detail in the following with the aid of the drawing

DETAILED DESCRIPTION OF THE INVENTION

Figure 1:
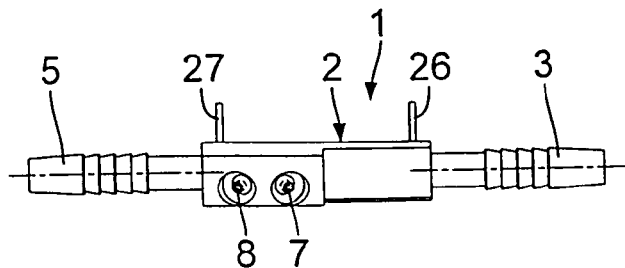
FIG. 1 is a view from above of a first embodiment of a nozzle body.
Figure 2:
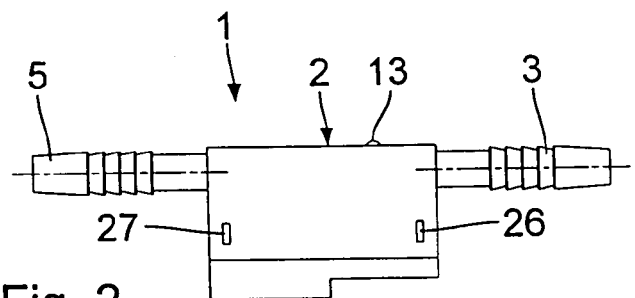
FIG. 2 is a view from the side of the nozzle body according to FIG. 1.

FIG. 1 shows a view from above of a nozzle body 1 according to a first exemplary embodiment. The nozzle body 1 is one component of a cleaning system, for example a windshield or headlamp cleaning system for a motor vehicle. In this exemplary embodiment, nozzle body 1 includes a one-piece basic body 2 of an electrically conductive polymer. Basic body 2 is connected via a connecting piece or adapter 3 in the form of a feed element and with the aid of a tube, not shown herein, to a cleaning liquid supply container.

Connecting piece 3 is connected via a bypass channel 4 to a different connecting piece 5 which is also formed onto basic body 2 and is aligned with connecting piece 3. Connecting piece 5 represents a return-flow line element for cleaning liquid and is connected via a different tube, not shown herein, to the supply container for cleaning liquid.

Two spray balls 7, 8 of metal, which represent nozzle elements, are connected via a connecting channel section 6 to the connecting piece 3 for supplying the cleaning liquid. The spray balls 7, 8 are positioned inside complementary receptacles 9, 10 in basic body 2, so that their spraying direction can be adjusted through a corresponding rotation of the spray balls 7, 8 in receptacles 9, 10.

Connecting channel section 6 includes a tap line section 11 that enters the basic body 2 from the outside through a side wall 12. Tap line section 11 penetrates bypass channel 4 between connecting pieces 3, 5. At the location where tap line section 11 penetrates side wall 12, it is closed off by a closing ball 13 that is accommodated in side wall 12. Starting with bypass channel 4, tap line section 11 empties into a nozzle line section 14 of connecting channel section 6. Nozzle line section 14 connects tap line section 11 to spray balls 7, 8. Nozzle line section 14 continues toward the outside via a through bore 15 on the side of nozzle line section 14 which is located opposite the mouth of tap line section 11, as seen from spray balls 7, 8. The through bore is closed off with a basic valve body 16 of a reflux or return valve 17 in nozzle line section 14. Basic valve body 16 contains a through channel 18, angled by 90°, which connects tap line section 11 to nozzle line section 14. Through channel 18 can be closed off with a valve part 19, embodied as an elastic valve disk. Valve disk 19 has a wedge shape and is tapered toward its outer edge, so that its rigidity decreases toward the edge. Valve disk 19 is connected via a holding element 20, extending through the center of through channel 18, to a securing element 21 that is held in a form-locking manner inside basic valve body 16.

Valve disk 19 is made of an elastic plastic material. Valve disk 19, the holding element 20 and securing element 21 jointly form a one-piece structural component.

Figure 5:
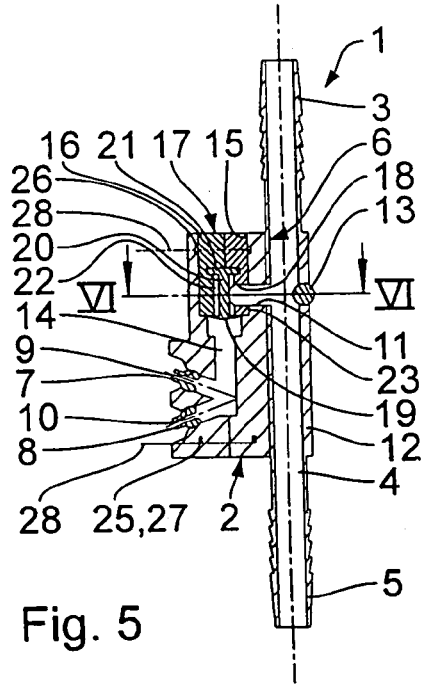
FIG. 5 is a section along the line V-V in FIG. 4.
Figure 4:
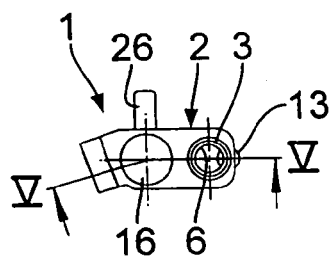
FIG. 4 is a view of the nozzle body according to FIG. 1, as seen in the direction of a feed line toward the nozzle body.
Figure 6:
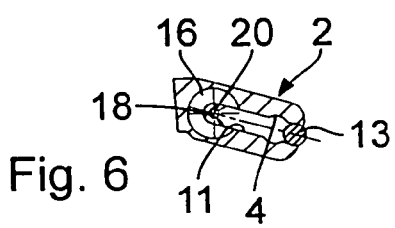
FIG. 6 is a section along the line VI-VI in FIG. 5.

For the closed position shown in FIG. 5, valve disk 19 closes off a ring-shaped through opening 22 of the through channel 18, which is delimited on one side by holding body 20 and on the other side by basic valve body 16. For this, valve disk 19 rests against a side wall 23 of valve body 16 that is facing the nozzle line section 14, and which represents a valve seat for the reflux valve 17. In an opened position of reflux valve 17, which is not shown herein, elastic valve disk 19 bends through so that it is lifted off side wall 23, so that the through opening 22 in through channel 18 opens up.

Figure 3:
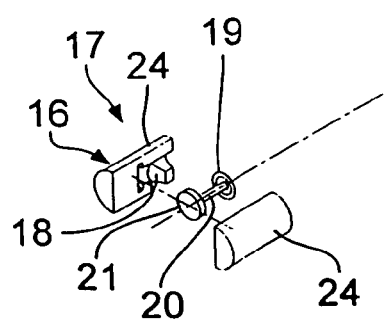
FIG. 3 is a perspective, exploded view of the nozzle body according to FIG. 1.
Figure 7:
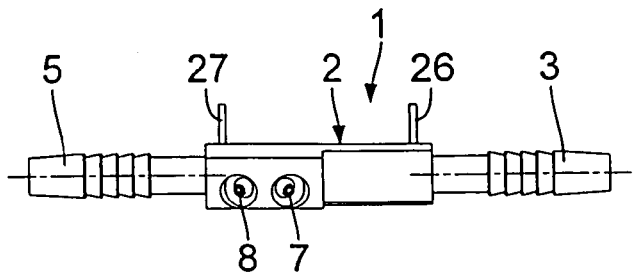
FIGS. 7-12 are representations of a different embodiment of a nozzle body, similar to the ones shown in FIGS. 1 to 6.
Figure 8:
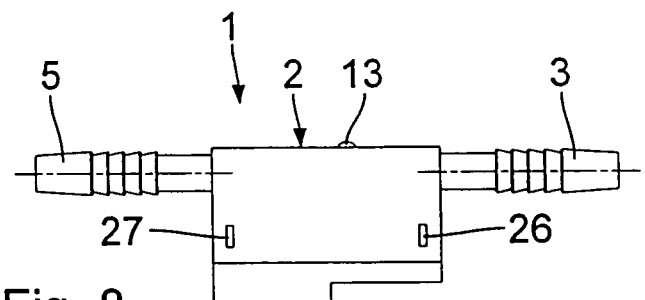
Figure 10:
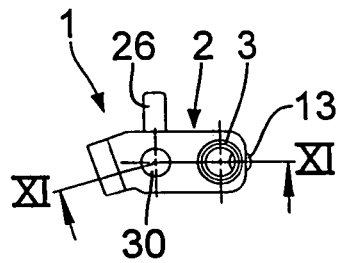
Figure 11:
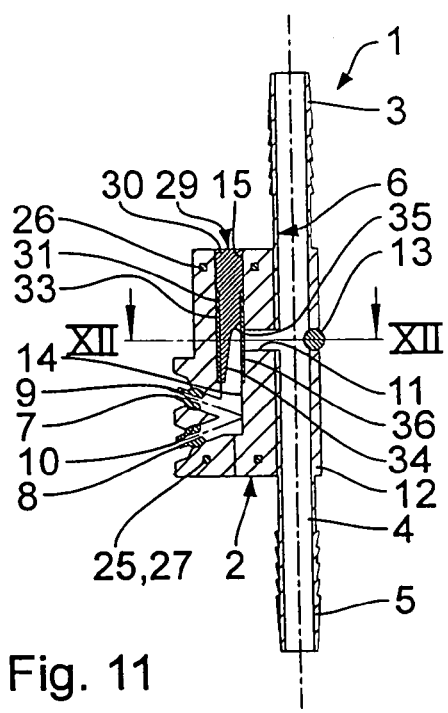
Figure 12:
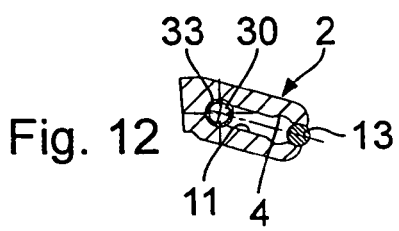
Figure 9:
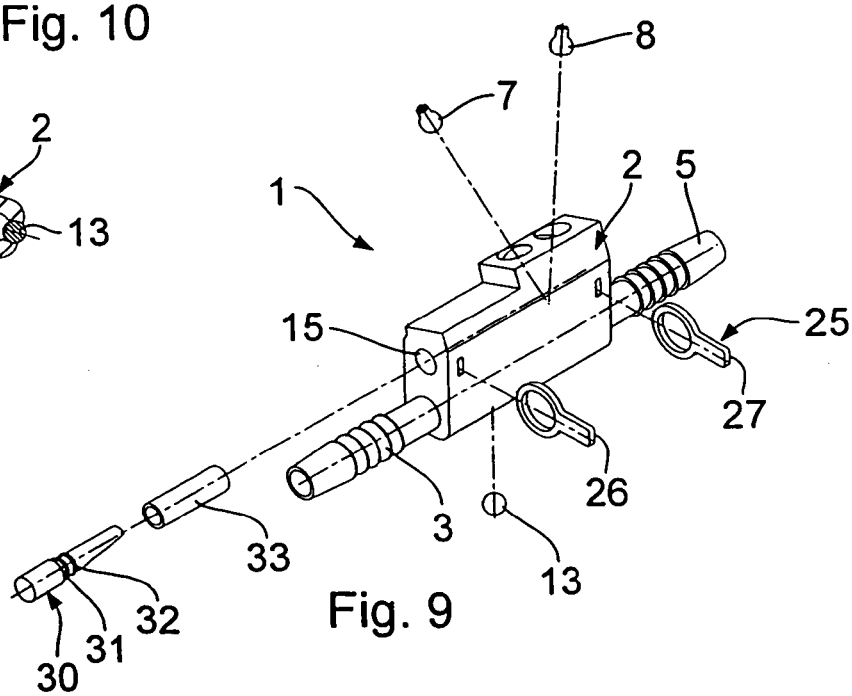
Figure 13:
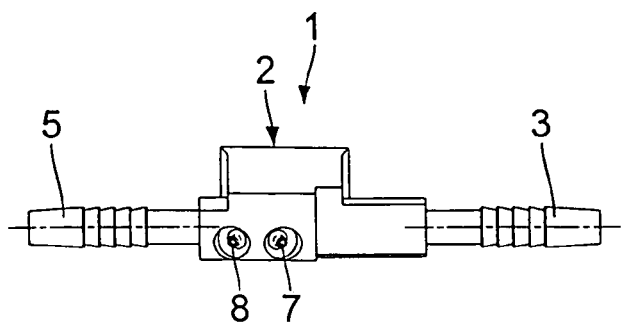
FIGS. 13-18 are representations of a different embodiment of a nozzle body, similar to the ones shown in FIGS. 1 to 6.
Figure 17:
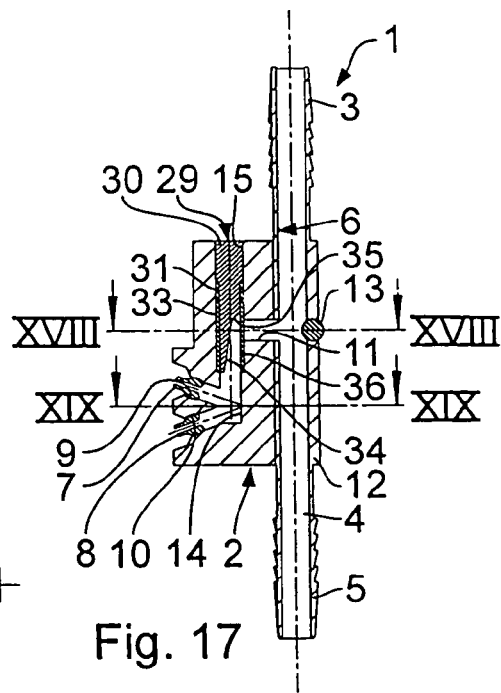
Figure 14:
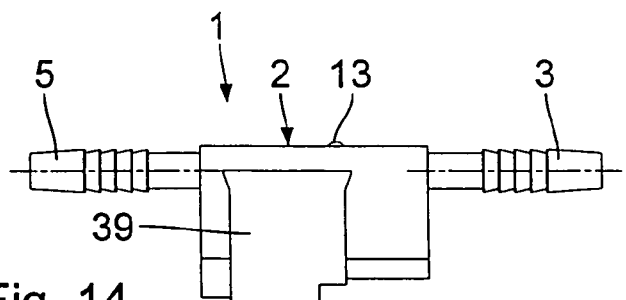
Figure 19:
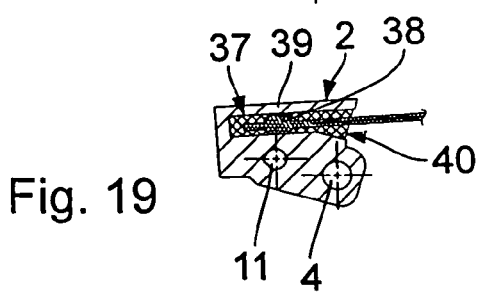
FIG. 19 is a section along the line XIX-XIX in FIG. 17.
Figure 16:
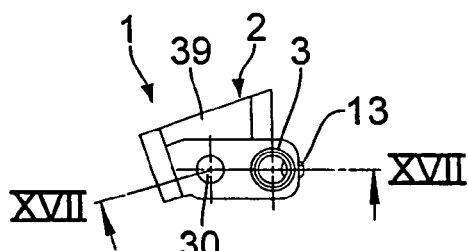
Figure 18:
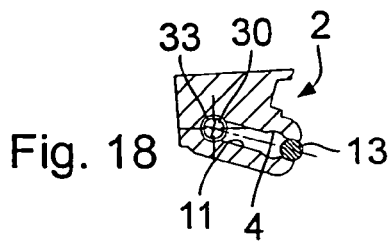
Figure 15:
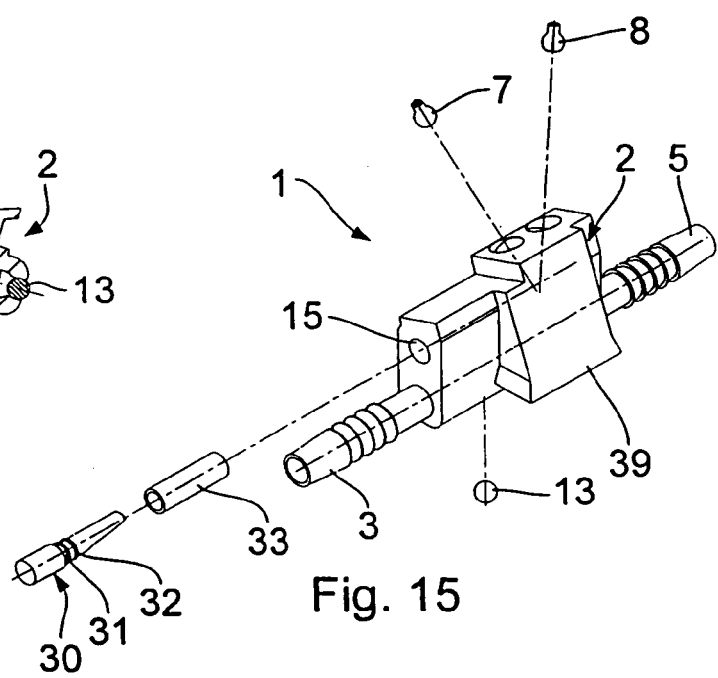

FIG. 3 shows that basic valve body 16, which on the whole has a cylindrical outside contour, consists of two plastic half shells 24 that are fitted together.

A heating device 25 in the form of an electrical resistance heater is provided for the embodiment shown in FIGS. 1 to 6 for heating connecting channel section 6, in particular tap line section 11, through channel 18, through opening 22, nozzle line section 14 and spray balls 7, 8. The heating device comprises two electrical contact elements 26, 27, around which basic body 2 is injection-molded and which are connected to a voltage source, not shown herein, such as the vehicle onboard supply network. Terminal contact elements 26, 27 each comprise a ring-shaped contact element in addition to a connecting pin that projects from basic body 2. Ring planes 28 are provided on the contact bodies of the terminal contact elements 26, 27 and are arranged parallel to each other at a distance. The ring-shaped contact elements are aligned with each other. Terminal contact element 26 is arranged in basic body 2, in the region of through bore 15, and surrounds basic valve body 16 of reflux valve 17. Terminal contact element 27 is arranged in basic body 2, at the end that is located opposite through bore 15.

A heating zone between terminal contact elements 26, 27 is the zone primarily heated by heating device 25 as a result of current flowing between terminal contact elements 26, 27.

Spray balls 7, 8 in particular are also located in this heating zone. Furthermore located in this heating zone are nozzle line section 14, reflux valve 17, and tap line section 11. Spray balls 7, 8 are comprised of metal and have a lower electrical resistance than basic body 2 of electrically conductive polymer. A higher current thus flows through spray balls 7, 8 during the heating with heating device 25, so that a higher heating output is deposited in spray balls 7, 8 and the heating zone is thus displaced in the direction of the spray balls 7, 8.

The ring-shaped design of the terminal contact elements 26, 27 allows the heating current in the basic body to flow around nozzle line section 14 during the heating operation, thus heating up this section with particular efficiency.

The nozzle body 1 is used as follows:

Upon activation of a feed pump, not shown herein, in the tube between the supply container and nozzle body 1, cleaning liquid is pumped through bypass channel 4. Bypass channel 4, which is relatively wide as compared to tap line section 11, ensures a quick feeding of the cleaning liquid to nozzle body 1. As a result of the cleaning liquid pressure in bypass channel 4 and tap line section 11, reflux valve 17 opens up, wherein valve disk 19 lifts off the side wall 23 that represents the valve seat. The cleaning liquid can thus flow through nozzle line section 14 and can exit at spray balls 7, 8. Depending on the location where nozzle body 1 is used, the cleaning liquid then cleans a vehicle windshield or a vehicle headlight.

Heating device 25 thus prevents the cleaning liquid from freezing inside nozzle body 1 if the outside temperatures are correspondingly low.

Nozzle body 1 is heated up sufficiently fast by heating device 25, in particular in the heating zone between terminal contact elements 26, 27, so that nozzle line section 14 and spray balls 7, 8 remain unobstructed.

Once the feed pump stops operating, valve body 19 automatically returns to the closing position as a result of its elastic restoring force and the drop in the cleaning liquid pressure. In this position, reflux valve 17 prevents cleaning liquid from flowing out of tap line 11 and bypass channel 4. As a result, cleaning liquid is immediately available to the spray balls 7, 8 during the next activation of the feed pump, without having to wait for bypass channel 4 to fill up again.

FIGS. 7 to 12 show a different embodiment of a nozzle body 1. Components which correspond to those described in the above with reference to FIGS. 1 to 6 are provided with the same reference numbers and are not again explained in further detail.

Nozzle body 1 as shown in FIGS. 7 to 12 differs from the nozzle body for the return valve shown in FIGS. 1 to 6 in that it has a different return valve design. A reflux valve 29 having the design as shown in FIGS. 7 to 12 is provided with a basic valve body 30 which has an essentially cylindrical outside contour and is fitted into through bore 15 in basic body 2. The outside wall of valve body 30 has a step-type recess 31 with two peripheral ribs 32. An elastic tube section 33 is fitted over the latter, which functions as a valve body for reflux valve 29. The basic valve body 30 is provided with a slanted wall or stop body 34 at the end which is inserted into nozzle line section 14, thus reducing the volume of basic valve body 30 so that a through channel 35 exists in basic valve body 30 between tap line section 11 and nozzle line section 14. In a closed position of reflux valve 29, shown in FIG. 11, tube section 33 rests against a valve seat 36 that is formed by an internal wall of the basic body 2 which surrounds the area where tap line section 11 empties into nozzle line section 14.

In an opened position of reflux valve 29, tube section 33 rests against slanted wall 34 of basic valve body 30, so that through channel 35 is exposed.

Reflux valve 29 for the embodiment according to FIGS. 7 to 12 operates as described in the following:

Once the feed pump is activated, the cleaning liquid pressure in tap line section 11 ensures that tube section 33 is pushed against slanted wall 34. As a result, through channel 25 opens up and thus also reflux valve 29. Once the feed pump stops operating, the missing cleaning liquid pressure ensures that the tube section 33 is elastically restored to its original shape and rests against valve seat 36, thus closing off through channel 35 and also reflux valve 29.

FIGS. 13 to 19 show a different embodiment of a nozzle body 1. All components corresponding to the components described in the above with reference to FIGS. 1 to 12 are given the same reference numbers and will not be explained again in further detail.

The design of nozzle body 1 of this additional embodiment corresponds to the design of the embodiment according to FIGS. 7 to 12, but is provided with a different heating device 37. The latter comprises a PTC element 38 that is contained inside a heater housing 39 that is formed integrally with basic body 2. Heater housing 39 is formed on the side of basic body 2, at a level of spray balls 7, 8, so that PTC element 38 is located adjacent to spray balls 7, 8 as well as nozzle line section 14.

Heater housing 39 is filled between PTC element 38 and basis body 2 with a layer of thermo-conducting cast resin 40, which holds PTC element 38 in place inside heater housing 39.

The heating device 37 functions as described in the following: Upon activating PTC element 38, this element heats adjacent basic body 2 by way of cast resin 40, primarily in a heating zone where spray balls 7, 8 as well as nozzle line section 14 are located, thus preventing these components from icing up.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A nozzle body for a cleaning system on a motor vehicle, comprising:
   at least one feed line element adapted for connection to a cleaning liquid supply container;
   a basic body having a channel section;
   at least one return-flow line element adapted to be connected to the cleaning liquid supply container, wherein the connecting channel section includes a bybass element between the feed line element and the return-flow element, and wherein the bybass element comprises a tap line section which penetrates the basic body from the outside through a wall and penetrates the connecting channel section between the feed line element and the return-flow element, forming an intersection, wherein the tap line section is closed off by a closing element at the location where the tap line section penetrates the wall of the basic body;
   at least one nozzle element connected to the feed line element by the channel section in the basic body; and
   a heating device to heat the connecting channel section and arranged adjacent to the nozzle element, such that the nozzle element is located in a heating zone that is primarily heated by the heating device, wherein the heating device comprises an electrical resistance heater including two ring-shaped, substantially aligned electrical terminal contact elements defining substantially parallel ring planes, between which the heating zone is located, and wherein the nozzle element is located in the heating zone through which a heating current flows between the terminal contact elements and the heating zone comprises a portion of a volume of the basic body made of conductive plastic.

2. The nozzle body according to claim 1, wherein the basic body and the nozzle element are made from electrically conductive material, wherein the material of the nozzle element has a lower electrical resistance than the material of the basic body.

3. The nozzle body according to claim 1, further comprising:
   a reflux valve in the connecting channel section of the basic body which prevents a return flow of cleaning liquid from the nozzle element to the supply container.

4. The nozzle body according to claim 3, wherein the reflux valve has a valve body that is elastically deformable by a pressure of the cleaning liquid.

5. The nozzle body according to claim 3, wherein the reflux valve closes off a through opening between the connecting channel section and an outside of the basic body.

6. The nozzle body according to claim 4, wherein the valve body comprises an elastic valve disk which comes to rest against a valve seat that delimits a through opening in the connecting channel section, and wherein a wall thickness of the valve disk decreases toward an outer edge of the valve disk.

7. The nozzle body according to claim 4, wherein the valve body comprises a flexible tube section which comes to rest on a valve seat that delimits a through opening in the connecting channel section.

8. The nozzle body according to claim 4, wherein the reflux valve includes a stop body for delimiting the elastic deformation of the valve body.

9. The nozzle body according to claim 1, wherein the nozzle element comprises a spray ball held inside a complementary receptacle of the basic body.

10. The nozzle body according to claim 9, wherein the nozzle element is held in the receptacle in a manner to be replaceable.

11. A nozzle body for a cleaning system on a motor vehicle, comprising:
    at least one feed line element adapted for connection to a cleaning liquid supply container;
    at least one feed line element adapted for connection to a cleaning liquid supply container;
    a basic body having a channel section;
    at least one return-flow line element adapted to be connected to the cleaning liquid supply container, wherein the connecting channel section includes a bybass element between the feed line element and the return-flow element, and wherein the bypass element comprises a tap line section which penetrates the basic body from the outside through a wall and penetrates the connecting channel section between the feed line element and the return-flow element, forming an intersection, wherein the tap line section is closed off by a closing element at the location where the tap line section penetrates the wall of the basic body;
    at least one nozzle element connected to the feed line element by the channel section in the basic body;
    a heating device to heat the connecting channel section and arranged adjacent to the nozzle element, such that the nozzle element is located in a heating zone that is primarily heated by the heating device; and
    a reflux valve in the connecting channel section of the basic body which prevents a return flow of cleaning liquid from the nozzle element to the supply container, wherein the reflux valve comprises a valve body including:
    a flexible tube section that is elastically deformable by a pressure of the cleaning liquid; and
    a valve body fitted within the flexible tube section and having a slanted wall at one end defining a valve seat for delimiting the elastic deformation of the flexible tube section.

12. The nozzle body according to claim 11, wherein the heating device comprises a positive temperature coefficient (PTC) element within the basic body, wherein the nozzle element is positioned directly in front of the PTC element and wherein the heating device contains a layer of thermoconducting cast resin around the PTC element.

* * * * *